United States Patent
Kawata et al.

(10) Patent No.: US 11,644,075 B2
(45) Date of Patent: May 9, 2023

(54) METHOD FOR MANUFACTURING FRICTION MATERIAL

(71) Applicant: AKEBONO BRAKE INDUSTRY CO., LTD., Tokyo (JP)

(72) Inventors: Toru Kawata, Tokyo (JP); Shuichi Oshiden, Tokyo (JP); Atsushi Ueno, Tokyo (JP)

(73) Assignee: AKEBONO BRAKE INDUSTRY CO., LTD., Tokyo (JP)

(*) Notice: Subject to any disclaimer, the term of this patent is extended or adjusted under 35 U.S.C. 154(b) by 447 days.

(21) Appl. No.: 16/642,593

(22) PCT Filed: Aug. 17, 2018

(86) PCT No.: PCT/JP2018/030469
§ 371 (c)(1),
(2) Date: Feb. 27, 2020

(87) PCT Pub. No.: WO2019/044532
PCT Pub. Date: Mar. 7, 2019

(65) Prior Publication Data
US 2020/0347901 A1    Nov. 5, 2020

(30) Foreign Application Priority Data

Aug. 31, 2017  (JP) .............................. JP2017-167188

(51) Int. Cl.
*F16D 69/02*        (2006.01)
(52) U.S. Cl.
CPC .... *F16D 69/026* (2013.01); *F16D 2200/0021* (2013.01); *F16D 2200/0056* (2013.01); *F16D 2200/0095* (2013.01)
(58) Field of Classification Search
CPC ........... F16D 69/026; F16D 2200/0021; F16D 2200/0056; F16D 2200/0095
See application file for complete search history.

(56) References Cited

U.S. PATENT DOCUMENTS

| 6,143,051 | A | 11/2000 | Kraemer et al. | |
| 6,524,681 | B1 | 2/2003 | Seitz et al. | |
| 2012/0259036 | A1* | 10/2012 | Takahashi | F16D 69/026 264/320 |
| 2013/0329514 | A1* | 12/2013 | Farrar | B01F 31/86 366/111 |

FOREIGN PATENT DOCUMENTS

| CN | 105199669 A | * 12/2015 |
| CN | 105134843 B | 8/2017 |
| JP | 2000-509467 A | 7/2000 |
| JP | 2001-501650 A | 2/2001 |
| JP | 2005-097374 A | 4/2005 |
| JP | 2009-030018 A | 2/2009 |
| JP | 2010-168550 A | 8/2010 |

OTHER PUBLICATIONS

International Search Report dated Oct. 2, 2018 for PCT/JP2018/030469.
International Search Report/Written Opinion dated Oct. 2, 2018 for PCT/JP2018/030469.
The Extended European Search Report dated Jul. 16, 2021 in European Patent Application No. 18850658.8.

* cited by examiner

*Primary Examiner* — Vishal R Sahni
(74) *Attorney, Agent, or Firm* — Faegre Drinker Biddle & Reath LLP

(57) ABSTRACT

A method for manufacturing a friction material containing a friction modifier, a fibrous material and a binder as raw materials is provided. The method includes a step of mixing and agitating the raw materials by low frequency acoustic agitation. A content of the fibrous material in the friction material may be 1 mass % or more and 50 mass % or less. The content of the fibrous material in the friction material may be 3 mass % or more and 40 mass % or less.

4 Claims, No Drawings

METHOD FOR MANUFACTURING FRICTION MATERIAL

TECHNICAL FIELD

The present invention relates to a method for manufacturing a friction material used for disc brake pads, brake linings, clutch facings, and the like of automobiles, railway vehicles, and industrial machines.

BACKGROUND ART

A friction material is manufactured by a step of mixing about 10 to 20 kinds of raw materials, and a step of preforming or heat compression molding the obtained mixture. A related mechanical mixer is used in the mixing step.

For example, Patent Literature 1 discloses that raw materials are mixed using an Eirich mixer which is a vertical mechanical mixer.

In addition, Patent Literature 2 discloses that raw materials are mixed using a Loedige mixer which is a horizontal mechanical mixer.

The mechanical mixer is characterized by causing convection to the raw materials using blades and screws and uniformly mixing the raw materials. In mixing the raw materials of the friction material, defiberization or dispersion of a fibrous material is very important for mixing the raw materials uniformly. When the mechanical mixer is used, the fibrous material collides with the blades rotating at a high speed, so that the fibrous material is defibrated or dispersed to achieve uniform mixing of the raw materials.

CITATION LIST

Patent Literature

Patent Literature 1: JP-A-2010-168550
Patent Literature 2: JP-A-2009-30018

SUMMARY OF INVENTION

Technical Problem

When mixing the raw materials of the friction material using the mechanical mixer, because of the structure, mixing occurs only in a portion where the raw materials are in contact with the blades, so it may take time until the raw materials are uniformly mixed.

In addition, an internal structure of the mechanical mixer is complicate due to the presence of blades, screws, and the like. Thus, there is a concern that cleaning after use is inadequate and contamination occurs, and a cleaning cycle after use requires a long time, so the manufacturing cycle of the friction material becomes long.

Further, a container of the mechanical mixer is often not completely sealed due to an air seal structure, and there is a concern that the working environment may deteriorate due to dust scattering from the inside.

The present invention has been made in view of the above circumstances in the related art, and an object of the present invention is to provide a new method for manufacturing a friction material which can mix raw materials in a short time, prevent contamination and dust scattering, and manufacture a friction material in a short cycle.

Solution to Problem

As a result of intensive studies, the present inventors have found that the above problems can be solved by mixing and agitating the raw materials of the friction material by low frequency acoustic agitation. Thus, the present invention has been completed.

That is, the present invention relates to the following <1> to <3>.

<1> A method for manufacturing a friction material containing a friction modifier, a fibrous material and a binder as raw materials, the method including a step of mixing and agitating the raw materials by low frequency acoustic agitation.

<2> The method for manufacturing a friction material according to <1>, wherein a content of the fibrous material in the friction material is 1 mass % or more and 50 mass % or less.

<3> The method for manufacturing a friction material according to <1> or <2>, wherein the content of the fibrous material in the friction material is 3 mass % or more and 40 mass % or less.

Advantageous Effects of Invention

According to the present invention, it is possible to provide a new method for manufacturing a friction material which can mix raw materials in a short time, prevent contamination and dust scattering, and manufacture a friction material in a short cycle.

DESCRIPTION OF EMBODIMENTS

Hereinafter, the present invention will be explained below in detail, but the following explanations only show an example of preferred embodiments, the present invention is not limited thereto.

In the present description, "mass" has the same meaning as "weight".

[Raw Materials]

The friction material of the present invention contains a friction modifier, a fibrous material, and a binder as raw materials.

<Friction Modifier>

The friction modifier is used to impart desired friction properties such as wear resistance, heat resistance, and fade resistance to the friction material.

Examples of the friction modifier include an inorganic filler, an organic filler, metal powder, an abrasive, and a lubricant. In the present invention, the friction modifier is preferably used in an amount of 50 mass % to 90 mass %, and more preferably 50 mass % to 80 mass % in the entire friction material.

Examples of the inorganic filler include titanate compounds, barium sulfate, calcium carbonate, calcium hydroxide, vermiculite and mica. These inorganic fillers can be used alone or in combination of two or more thereof.

Here, examples of the titanate compounds include potassium titanate, lithium titanate, lithium potassium titanate, sodium titanate, calcium titanate, magnesium titanate, magnesium potassium titanate, and barium titanate. From the viewpoint of improving wear resistance of the friction material, potassium titanate, lithium potassium titanate, and magnesium potassium titanate are preferred.

Examples of the organic filler include various rubber powder (such as raw rubber powder and tire powder), rubber dust, cashew dust, tire tread, and melamine dust. These organic fillers can be used alone or in combination of two or more thereof.

Examples of the metal powder include aluminum, tin, and zinc. These metal powders can be used alone or in combination of two or more thereof.

Examples of the abrasive include alumina, silica, magnesia, zirconia, zirconium silicate, chromium oxide, iron oxides such as triiron tetroxide ($Fe_3O_4$), and chromite. These abrasives can be used alone or in combination of two or more thereof.

Examples of the lubricant include graphite, coke, antimony trisulfide, molybdenum disulfide, tin sulfide, and polytetrafluoroethylene (PTFE). These lubricants can be used alone or in combination of two or more thereof.

<Fibrous Material>

The fibrous material is used to ensure sufficient strength of the friction material.

As the fibrous material, an organic fiber, an inorganic fiber, and a metal fiber are used.

In the present invention, the fibrous material is preferably used in an amount of 1 mass % to 50 mass %, and more preferably 3 mass % to 40 mass % in the entire friction material. When the content of the fibrous material is 1 mass % or more, sufficient strength of the friction material can be ensured. When the content of the fibrous material is 50 mass % or less, the fibrous material is quickly defibrated or dispersed and a mixing time can be shortened in a raw material mixing step.

Examples of the organic fiber include an aramid fiber (aromatic polyamide fiber), a cellulose fiber, and a flame resistant acrylic fiber.

Examples of the inorganic fiber include a ceramic fiber, a bio-soluble inorganic fiber, a glass fiber, a carbon fiber, or rock wool.

Examples of the metal fiber include a steel fiber.

These fibers can be used alone or in combination of two or more thereof.

Among these, the bio-soluble inorganic fiber is preferred as the inorganic fiber because of having little influence on the human body. Examples of such a bio-soluble inorganic fiber include bio-soluble ceramic fibers such as a $SiO_2$—$CaO$—$MgO$ fiber, a $SiO_2$—$CaO$—$MgO$—$Al_2O_3$ fiber, and a $SiO_2$—$MgO$—$SrO$ fiber, or bio-soluble rock wool.

<Binder>

The binder is used to integrate the raw materials of the friction material. In the present invention, the binder is preferably used in an amount of 1 mass % to 15 mass %, and more preferably 3 mass % to 10 mass % in the entire friction material.

As the binder, various commonly used binders can be used. Examples thereof include thermosetting resins such as a phenol resin, various modified phenol resins (such as an elastomer-modified phenol resin), a melamine resin, an epoxy resin, and a polyimide resin.

Examples of the elastomer-modified phenol resin include an acrylic rubber-modified phenol resin, a silicone rubber-modified phenol resin, and a nitrile rubber (NBR)-modified phenol resin. These binders can be used alone or in combination of two or more thereof.

A content of the copper component in the friction material of the present invention is preferably 0.5 mass % or less and it is more preferable not to contain the copper component, from the viewpoint of environmental impact reduction.

[Method for Manufacturing Friction Material]

In the method for manufacturing a friction material, first, the raw materials are mixed and agitated by low frequency acoustic agitation.

The low frequency acoustic agitation is a technique of mixing and agitating materials to be treated by giving the same low frequency acoustic energy, and is described in, for example, JP-T-2016-534858, JP-T-2015-527197 and JP-T-2015-525122.

In the low frequency acoustic agitation, a container to which the raw materials of the friction material are charged can be vibrated by a low frequency acoustic energy of 30 Hz to 1 kHz (for example, 60 Hz), to cause convection to the raw materials in the container and mixing the materials uniformly at a high speed. In addition, in the low frequency acoustic agitation, when the fibrous material collides with other raw materials, the fibrous material is defibrated or dispersed.

Therefore, the fibrous material can be prevented from being a fiber agglomerate having a diameter of 1 mm or more in the raw material mixture.

The time for performing the low frequency acoustic agitation may be appropriately adjusted according to the total amount of raw materials to be mixed, and is preferably 60 seconds or longer, and an upper limit of the mixing time can be 180 seconds or shorter, for example.

In the low frequency acoustic agitation, by propagating acoustic energy to the entire container, unlike a case in the related art, mechanical energy can be uniformly transferred to all raw materials, and mixing proceeds rapidly throughout the container. Accordingly, the raw materials can be mixed efficiently in a short time.

In addition, in the low frequency acoustic agitation, since the mixing and agitating are performed when the container is sealed, contamination and dust scattering can be prevented, and the friction material can be manufactured in a short cycle without the need to clean the apparatus.

The low frequency acoustic agitation is different from ultrasonic agitation in that the frequency of the acoustic energy is several orders of magnitude lower. Most ultrasonic (>20 kHz) energy is completely absorbed by the material just before an ultrasonic transducer.

Next, a preforming step of obtaining a preform having a predetermined shape by putting the raw material mixture obtained by the low frequency acoustic agitation into a preforming mold and performing compression molding, a heat compression molding step of obtaining a heat compression molded body by putting the preform into a thermal molding mold, performing a heat compression molding processing at a predetermined molding pressure and temperature, and molding the preform into a predetermined friction material shape, and a post-processing step of completing the heat compression molded body to a desired shape of the friction material by appropriately performing a heat treatment, a grinding treatment, or the like on the heat compression molded body are successively performed, so as to manufacture the friction material of the present invention.

The conditions for the heat compression molding are not particularly limited, and it is preferable that the temperature is 130° C. to 180° C., the pressure is 30 MPa to 80 MPa, and the pressure time is 2 minutes to 10 minutes during the heat compression treatment.

The conditions for the heat treatment are not particularly limited, and the heat treatment is preferably performed at a temperature of 150° C. to 300° C. for 1 hour to 5 hours.

In a normal heat compression molding step, a thermal molding apparatus is used, and a pressure molding step of molding a preform and a depressurization (gas release) step of releasing the molding pressure are alternately repeated as many times as necessary. In the depressurization step, the gas generated in the thermal molding mold can be discharged by opening the thermal molding mold.

EXAMPLES

The present invention will be specifically described by way of the following examples, but the present invention is not limited thereto.

The following examples, comparative examples and reference test examples were evaluated. The evaluation method is as follows.

(Appearance Inspection on Raw Material Mixture)

The raw material mixture before molding was inspected based on the following criteria.

○: There was no material segregation or fiber agglomerate (agglomerate having a diameter of 1 mm or more) in the obtained mixture.

×: There was material segregation or fiber agglomerate (agglomerate having a diameter of 1 mm or more) in the obtained mixture.

(Shear Test)

A test piece (30 mm×10 mm×4.8 mm in thickness) of a friction material was prepared, and shear strength ($N/cm^2$) was measured according to JIS D4422 (Japanese Industrial Standards No. D4422), and evaluated based on the following criteria.

○: The shear strength ($N/cm^2$) was 700 or more.

×: The shear strength ($N/cm^2$) was less than 700.

(Friction Coefficient Measurement)

In a full-size dynamometer test in accordance with JASO C406 (second effectiveness test with braking for 10 times and an initial braking speed of 100 km/h) (Japanese Automotive Standards Organization No. C406), an average value μ of the friction coefficient of the friction material was measured, and the friction materials having composition A and composition B described later were evaluated based on the following criteria.

<Evaluation Criteria for Friction Material (Composition A)>

○: The average value μ of the friction coefficient was within 0.35±10%.

×: The average value μ of the coefficient of friction was out of 0.35±10%.

<Evaluation Criteria for Friction Material (Composition B)>

○: The average value μ of the friction coefficient was within 0.45±10%.

×: The average value μ of the coefficient of friction was out of 0.45±10%.

Example 1

<Preparation of Friction Material>

The raw materials of the friction material blending composition (Composition A) shown in Table 1 were subjected to low frequency acoustic agitation at 60 Hz and an acceleration of 100 G for 60 seconds using a commercially available low frequency acoustic agitation mixer to obtain a raw material mixture.

The above appearance inspection was performed on the obtained raw material mixture.

Next, the obtained raw material mixture was put into a mold and pressed at a pressure of 10 MPa for 5 seconds to prepare a preform.

The obtained preform was put into a thermal molding mold, a metal plate previously coated with an adhesive was stacked, and heat compression molding was performed for 6 minutes at a pressure of 30 MPa and a molding temperature of 150° C.

The obtained heat compression molded body was subjected to a heat treatment at 250° C. for 3 hours, processed, grinded and painted to prepare the friction material of Example 1.

The shear test and the friction coefficient measurement were performed on the obtained friction material.

Table 2 shows the results of appearance inspection, shear test, and friction coefficient measurement on the raw material mixture.

Examples 2 to 5

The test was performed in the same manner as in Example 1 except that the mixing time of the raw materials of the friction material composition (composition A) was changed to those shown in Table 2. The results are shown in Table 2.

Comparative Examples 1 to 6

When mixing the raw materials of the friction material blending composition (Composition A) with a rotary rocking mixer (double cone type mixer), the mixing time of the raw materials was changed to those shown in Table 2, fiber agglomerates (agglomerates having a diameter of 1 mm or more) were found in the raw material mixture. Therefore, the molding was not performed, and the shear test and the friction coefficient measurement were not performed.

Comparative Examples 7 to 10

When mixing the raw materials of the friction material blending composition (Composition A) with a vertical mechanical mixer (Eirich mixer), the mixing time of the raw materials was changed to those shown in Table 2, fiber agglomerates (agglomerates having a diameter of 1 mm or more) were found in the raw material mixture. Therefore, the molding was not performed, and the shear test and the friction coefficient measurement were not performed were not performed.

Comparative Examples 11 to 12

The test was performed in the same manner as in Example 1 except that the raw materials of the friction material blending composition (composition A) were mixed with a vertical mechanical mixer (Eirich mixer) and the mixing time of the raw materials was changed to those shown in Table 2. The results are shown in Table 2.

TABLE 1

| Composition (composition A) of friction material | | | [Unit: mass %] |
|---|---|---|---|
| Binder | | Phenol resin | 8.0 |
| Fibrous material | | Aramid fiber | 5.0 |
| | | Cellulose fiber | 8.0 |
| Friction modifier | Filler | Cashew dust | 3.0 |
| | | Rubber dust | 3.0 |
| | | Mica | 3.0 |
| | | Calcium carbonate | 7.0 |
| | | Barium sulfate | 24.5 |
| | | Calcium titanate | 13.0 |
| | Lubricant | Graphite | 10.5 |
| | Abrasive | Iron oxide | 9.0 |
| | | Zirconium silicate | 6.0 |
| Total | | | 100.0 |

TABLE 2

| | | | Example | | | | | Comparative Example | | | | | | | | | | | |
|---|---|---|---|---|---|---|---|---|---|---|---|---|---|---|---|---|---|---|---|
| | | | 1 | 2 | 3 | 4 | 5 | 1 | 2 | 3 | 4 | 5 | 6 | 7 | 8 | 9 | 10 | 11 | 12 |
| Mixing type | | | Low frequency acoustic agitation | | | | | Rotary rocking mixer | | | | | | Vertical mechanical mixer | | | | | |
| Mixing time [s] | | | 60 | 120 | 180 | 240 | 300 | 30 | 60 | 120 | 180 | 240 | 300 | 30 | 60 | 120 | 180 | 240 | 300 |
| Evaluation | Appearance | Determination | ○ | ○ | ○ | ○ | ○ | x | x | x | x | x | x | x | x | x | x | ○ | ○ |
| | Shear strength | Strength [N/cm²] | 801 | 768 | 772 | 795 | 790 | Since fiber agglomerate is found, evaluation is not performed. | | | | | | | | | | 795 | 780 |
| | | Determination | ○ | ○ | ○ | ○ | ○ | | | | | | | | | | | ○ | ○ |
| | Friction coefficient | Average value μ | 0.35 | 0.35 | 0.34 | 0.34 | 0.35 | | | | | | | | | | | 0.35 | 0.35 |
| | | Determination | ○ | ○ | ○ | ○ | ○ | | | | | | | | | | | ○ | ○ |

As seen from the results in Table 2, in the case of preparing a friction material by mixing the raw materials with low frequency acoustic agitation, a friction material equivalent to the friction material (Comparative Examples 11 and 12) prepared by a vertical mechanical mixer over 240 seconds and 300 seconds was prepared in a mixing time as short as 60 seconds in Example 1, and the evaluations for Examples 2 to 5 were similar to that for Example 1.

In addition, since fiber agglomerates (agglomerates having a diameter of 1 mm or more) were found in the raw material mixture in Comparative Examples 1 to 10, the molding was not performed, and the shear test and the friction coefficient measurement were not performed.

Examples 6 to 10

The friction material blending composition was changed to that shown in Table 3 (composition 13), and the friction material was prepared in the same manner as in Example 1 with the mixing time of the raw materials being 60 seconds, 120 seconds, 180 seconds, 240 seconds, and 300 seconds. Evaluation similar to Example 1 was performed. The results are shown in Table 4.

Comparative Examples 13 to 16

When mixing the raw materials of the friction material blending composition (Composition B) with a vertical mechanical mixer (Eirich mixer), the mixing time of the raw materials was changed to those shown in Table 4, fiber agglomerates (agglomerates having a diameter of 1 mm or more) were found in the raw material mixture. Therefore, the molding was not performed, and the shear test and the friction coefficient measurement were not performed were not performed.

Comparative Examples 17 to 18

The test was performed in the same manner as in Example 6 except that the raw materials of the friction material blending composition (composition B) were mixed with a vertical mechanical mixer (Eirich mixer) and the mixing time of the raw materials was changed to those shown in Table 4. The results are shown in Table 4.

TABLE 3

| Composition (composition B) of friction material | | [Unit: mass %] |
|---|---|---|
| Binder | Phenol resin | 7.0 |
| Fibrous material | Aramid fiber | 5.0 |
| | Steel fiber | 30.0 |
| Friction modifier | Filler | Cashew dust | 3.0 |
| | | Rubber dust | 2.0 |
| | | Calcium hydroxide | 2.0 |
| | | Barium sulfate | 25.0 |
| | Lubricant | Graphite | 12.0 |
| | | Coke | 8.0 |
| | | Alumina | 1.0 |
| | | Chromite | 1.0 |
| | | Magnesia | 4.0 |
| Metal powder | Zinc powder | 2.0 |
| Total | | 100.0 |

TABLE 4

| | | | Example | | | | | Comparative Example | | | | | |
|---|---|---|---|---|---|---|---|---|---|---|---|---|---|
| | | | 6 | 7 | 8 | 9 | 10 | 13 | 14 | 15 | 16 | 17 | 18 |
| Mixing type | | | Low frequency acoustic agitation | | | | | Vertical mechanical mixer | | | | | |
| Mixing time [s] | | | 60 | 120 | 180 | 240 | 300 | 30 | 60 | 120 | 180 | 240 | 300 |
| Evaluation | Appearance | Determination | ○ | ○ | ○ | ○ | ○ | x | x | x | x | ○ | ○ |
| | Shear strength | Strength [N/cm²] | 1050 | 1034 | 1056 | 1032 | 1078 | Since fiber agglomerate is found, evaluation is not performed. | | | | 1048 | 1039 |
| | | Determination | ○ | ○ | ○ | ○ | ○ | | | | | ○ | ○ |
| | Friction coefficient | Average value μ | 0.43 | 0.45 | 0.45 | 0.44 | 0.45 | | | | | 0.44 | 0.45 |
| | | Determination | ○ | ○ | ○ | ○ | ○ | | | | | ○ | ○ |

As seen from the results in Table 4, even when the content of the fibrous material in the friction material is increased to 35 mass %, by preparing a friction material by mixing the raw materials with low frequency acoustic agitation, a friction material equivalent to the friction material (Comparative Examples 17 and 18) prepared by a vertical mechanical mixer over 240 seconds and 300 seconds was prepared in a mixing time as short as 60 seconds as in Example 6, and the evaluations for Examples 7 to 10 were similar to that for Example 6.

In addition, since fiber agglomerates (agglomerates having a diameter of 1 mm or more) were found in the raw material mixture in Comparative Examples 13 to 16, the molding was not performed, and the shear test and the friction coefficient measurement were not performed.

Reference Test Examples 1 to 6

The aramid fiber was subjected to low frequency acoustic agitation for a mixing time shown in Table 5 with a commercially available low frequency acoustic agitation mixer. The appearance inspection was performed in the same manner as in Example 1. The results are shown in Table 5.

TABLE 5

| | | Reference test example | | | | | |
|---|---|---|---|---|---|---|---|
| | | 1 | 2 | 3 | 4 | 5 | 6 |
| | Mixing type | Low frequency acoustic agitation | | | | | |
| | Mixing time [s] | 30 | 60 | 120 | 180 | 240 | 300 |
| Evaluation | Appearance Determination | x | x | x | x | x | x |

As seen from the results in Table 5, in the case of mixing only the aramid fiber with low frequency acoustic agitation, the aramid fiber cannot be defibrated, and in order to defibrate a fibrous material with low frequency acoustic agitation, it was necessary to mix the fibrous material with a substance other than the fibrous material such as a binder and a friction modifier.

Although the present invention has been described in detail using specific embodiments, it will be apparent to those skilled in the art that various modifications and variations are possible without departing from the spirit and scope of the present invention. The present application is based on a Japanese Patent Application (Japanese Patent Application No. 2017-167188) filed on Aug. 31, 2017, contents of which are incorporated herein by reference.

The invention claimed is:

1. A method for manufacturing a friction material containing a friction modifier, a fibrous material and a binder as raw materials, the method comprising:
   a step of mixing and agitating the raw materials by low frequency acoustic agitation at a frequency of 30 Hz to 1 kHz
   wherein a time for performing the low frequency acoustic agitation is in a range from 60 seconds to 300 seconds.

2. The method for manufacturing a friction material according to claim 1, wherein
   a content of the fibrous material in the friction material is 1 mass % or more and 50 mass % or less.

3. The method for manufacturing a friction material according to claim 1, wherein
   the content of the fibrous material in the friction material is 3 mass % or more and 40 mass % or less.

4. The method for manufacturing a friction material according to claim 1, wherein the time for performing the low frequency acoustic agitation is in a range from 60 seconds to 180 seconds.

* * * * *